United States Patent [19]

Amano et al.

[11] Patent Number: 5,679,730
[45] Date of Patent: Oct. 21, 1997

[54] EPOXY RESIN COMPOSITION AND EPOXY RESIN-BASED ADHESIVE

[75] Inventors: Satoshi Amano; Hideshi Tomita, both of Tokyo, Japan

[73] Assignee: Nisshinbo Industries, Inc., Tokyo, Japan

[21] Appl. No.: 643,923

[22] Filed: May 7, 1996

[30] Foreign Application Priority Data

Jun. 6, 1995 [JP] Japan ..................................... 7-164824

[51] Int. Cl.⁶ .............................. C08L 63/00; C08L 63/02
[52] U.S. Cl. ............................. 523/415; 525/528; 528/73; 528/123
[58] Field of Search .............................. 525/528; 528/73, 528/123; 523/415

[56] References Cited

U.S. PATENT DOCUMENTS 4,977,219 12/1990 Watson, Jr. ......................... 525/329.5
5,008,363 4/1991 Mallon et al. .......................... 528/49
5,393,839 2/1995 Iwamoto et al. ....................... 528/111

*Primary Examiner*—Frederick Krass
*Attorney, Agent, or Firm*—Kubovcik & Kubovcik

[57] ABSTRACT

An epoxy resin composition consisting essentially of an epoxy resin, a thixotropy-imparting agent, a filler used as necessary, water and a polycarbodiimide resin; and an epoxy resin-based adhesive comprising the above epoxy resin composition and a curing agent. The above epoxy resin composition has excellent thixotropy and low stringiness; and the above epoxy resin-based adhesive, when cured, shows neither metal corrosion nor reduction in moisture resistance despite the presence of water in the adhesive, and has excellent heat resistance and adhesivity.

15 Claims, No Drawings

EPOXY RESIN COMPOSITION AND EPOXY RESIN-BASED ADHESIVE

BACKGROUND OF THE INVENTION

(1) Field of the Invention

The present invention relates to an epoxy resin composition and an epoxy resin-based adhesive. More particularly, the present invention relates to a novel epoxy resin composition having excellent thixotropy and low stringiness, as well as to an epoxy resin-based adhesive using said epoxy resin composition, superior in heat resistance, adhesivity and corrosivity to metals.

(2) Description of the Prior Art

In general, epoxy resins give small shrinkage in curing and have excellent adhesion to metals, etc. Therefore, epoxy resins are in wide use as a main raw material in paints, adhesives, coating agents, etc. In these products, thixotropy is often an important property so that they can be applied so as to give a uniform film thickness, they cause no sagging after application, and so on.

Further, the above products, when used for adhesion of electronic parts, etc. to very small areas, must have low stringiness in addition to the above-mentioned thixotropy, for the control of application amount and the precise application to intended areas.

Many studies have been made on the method for imparting thixotropy. For example, Japanese Patent Application Kokai(Laid-Open) Nos. 97357/1986 and 233772/1990 disclose methods for imparting thixotropy by addition of organic or inorganic substances such as asbestos, fine particles of silicic anhydride, calcium carbonate, bentonite, polycarboxylic acid, polyamide wax and the like.

These methods can impart thixotropy, but the resulting epoxy resin has stringiness and is not suitable for precise application to the above-mentioned very small areas in a controlled amount. Further, many of the above-mentioned thixotropy-imparting agents adsorb or absorb the moisture present in air; therefore, when an epoxy resin composition containing such a thixotropy-imparting agent is used as an adhesive, the adhesive, when applied and cured, shows reduction in moisture resistance and causes corrosion of metals such as copper and the like. Thus, strict care must be taken for water control in production and handling of an epoxy resin composition containing the above thixotropy-imparting agent.

OBJECT AND SUMMARY OF THE INVENTION

The present inventors made a study in order to solve the above-mentioned problems. As a result, the present inventors found out that an epoxy resin composition having excellent thixotropy and low stringiness can be obtained by adding water and a polycarbodiimide resin to a composition comprising an epoxy resin, a thixotropy-imparting agent and, as necessary, a filler and further that an epoxy resin-based adhesive obtained by adding a curing agent to the above epoxy resin composition, when applied and cured, surprisingly shows neither metal corrosion nor reduction in moisture resistance, both caused by adsorbed or absorbed water and is superior in heat resistance and adhesivity. The present inventors made a further study and have completed the present invention.

According to the present invention, there are provided an epoxy resin composition consisting essentially of an epoxy resin, a thixotropy-imparting agent, a filler used as necessary, water and a polycarbodiimide resin; and an epoxy resin-based adhesive comprising the above epoxy resin composition and a curing agent.

DETAILED DESCRIPTION OF THE INVENTION

The present invention is hereinafter described in detail.

The epoxy resin composition of the present invention consisting essentially of an epoxy resin, a thixotropy-imparting agent, a filler used as necessary, water and a polycarbodiimide resin.

The epoxy resin used in the present invention includes epoxy resins having at least one epoxy group in the molecule, such as glycidyl ether type epoxy resin (e.g. bisphenol A type epoxy resin, phenol-novolac type epoxy resin or cresol-novolac type epoxy resin), alicyclic epoxy resin, hetero-cyclic epoxy resin, liquid rubber-modified epoxy resin and the like. Any resin which is called "epoxy resin", can be used in the present invention. However, preferred in the present invention is an epoxy resin which contains no solvent and which is a liquid at room temperature.

The thixotropy-imparting agent used in the present invention can be any known thixotropy-imparting agent. It includes inorganic fine particles such as fine silica powder, calcium carbonate, heavy calcium carbonate, bentonite and the like; and organic substances such as polycarboxylic acid, castor oil derivatives, polyamide wax and the like. It can be used in an amount of, for example, 0.1–30 parts by weight, preferably 1–15 parts by weight per 100 parts by weight of the epoxy resin.

The filler as necessary used in the present invention refers to a powdery filler, a flame retardant, a coloring agent or the like. Specifically, the powdery filler includes crystalline silica, fused silica, calcium carbonate, talc, mica, alumina, aluminum hydroxide, white carbon, carbon black, expanded graphite powder, powdery graphite, etc.; the flame retardant includes powdery organic halogen compounds, red phosphorus, antimony trioxide and the like; and the coloring agent includes various pigments and dyes. These fillers are appropriately selected and used based on the application of the present composition or adhesive. It can be used in an amount of, for example, 0.1–1000 parts by weight per 100 parts by weight of the epoxy resin.

The polycarbodiimide resin used in the present invention can be produced, for example, by a process disclosed in Japanese Patent Application Kokai (Laid-Open) No. 61599/1976, a process by L. M. Alberino et al. [J. Appl. Polym. Sci., 21, 1999 (1997)] and processes disclosed in Japanese Patent Application Kokai (Laid-Open) Nos. 292316/1990 and 56950/1994. That is, the polycarbodiimide resin can be produced from an organic diisocyanate in the presence of a catalyst which promotes the carbodiimidization of isocyanate.

The organic diisocyanate used in production of the polycarbodiimide resin may be any of aliphatic type, alicyclic type, aromatic type, aralkyl type, etc. These organic diisocyanates can be used singly or in combination of two or more.

The polycarbodiimide resin used in the present invention includes homopolymers and copolymers both containing at least one kind of recurring unit represented by the following formula:

(wherein R is an organic diisocyanate residue).

Specific examples of the organic diisocyanate corresponding to the above R [organic diisocyanate residue, i.e. the residue when two isocyanate (NCO) groups are removed from one molecule of an organic diisocyanate] include 2,4-tolylene diisocyanate, 2,6-tolylene diisocyanate, a mixture of 2,4-tolylene diisocyanate and 2,6-tolylene diisocyanate, crude tolylene diisocyanate, crude diphenylmethane diisocyanate, 4,4',4"-triphenylmethylene triisocyanate, xylylene diisocyanate, hexamethylene-1,6-diisocyanate, lysine diisocyanate, hydrogenated diphenylmethane diisocyanate, isophorone diisocyanate, tetramethylxylylene diisocyanate, 4,4'-biphenylene diisocyanate, diphenylmethane diisocyanate, 3,3'-dimethylphenylmethane-4,4'-diisocyanate, 3,3'-dimethyldiphenyl-4,4'diisocyanate, and mixtures thereof.

The polycarbodiimide resin may have isocyanate groups at the terminals, or, depending upon the application of the present composition or adhesive, the terminal isocyanate groups may be blocked with a monoisocyanate, a compound having one group selected from —NH$_2$, —NHR, —COOH, —SH and —OH groups, or an acid anhydride to control the molecular weight of the polycarbodiimide resin.

As mentioned above, the polycarbodiimide resin used in the present invention has no particular restriction but is preferably one which is easily mixed with the epoxy resin component and which is a powder or a liquid. It is used in an amount of 10 parts by weight or less, preferably 5 parts by weight or less per 100 parts by weight of the epoxy resin.

There is no particular restriction, either, as to the water used in the present invention. The water, however, is preferably pure water or ion-exchanged water because the metal ions (their kinds and amounts) and/or chlorine (its amount) in the present epoxy resin composition may have a problem when the composition is used as an adhesive, depending upon the application of the adhesive. The amount of water used is preferably 10 parts by weight or less, more preferably 5 parts by weight or less per 100 parts by weight of the epoxy resin. In some cases, the role of the water may be played by the water adsorbed or absorbed by the thixotropy-imparting agent, the filler added as necessary, or the like.

When water is added to an epoxy resin composition or is present therein as adsorbed or absorbed water, the water ordinarily reacts with the epoxy group in the following formula:

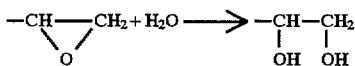

and impairs the curing reaction of the epoxy resin, reducing the water resistance and heat resistance of the cured film of the composition; or, the water is present per se and corrodes metals or vaporizes during soldering, inviting cracks. Therefore, in conventional epoxy resin compositions, the presence of water as added water or as adsorbed or absorbed water has been inconceivable.

It was found out, however, that when an ordinary epoxy resin composition is combined with a polycarbodiimide resin, (1) the polycarbodiimide resin reacts with the hydroxyl group formed in the above formula presumably as follows:

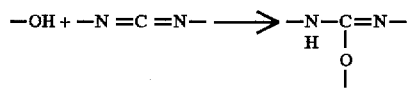

and there arises no reduction in crosslink density, (2) the water per se is trapped by the polycarbodiimide resin as follows:

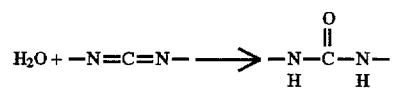

(3) the resulting product has an action of promoting the curing of the epoxy resin, and (4) the inherent features of epoxy resin composition are not impaired. Further, it is thought that the above reactions proceed hardly at ordinary temperature and proceed during curing.

It was also found out that the present epoxy resin composition comprising a polycarbodiimide resin and water shows a unique property of low stringiness without losing the thixotropy although the reason is unclear. This property has a correlation mainly with the amount of water contained therein, and a water amount of more than 10 parts by weight per 100 parts by weight of the epoxy resin impairs the thixotropy.

The epoxy resin-based adhesive of the present invention comprises (1) the above-mentioned epoxy resin composition consisting essentially of an epoxy resin, a thixotropy-imparting agent, a filler used as necessary, water and a polycarbodiimide resin, and (2) a curing agent.

The curing agent used in the present invention includes acid anhydrides such as methylnadic anhydride, dodecenylsuccinic anhydride, tetrahydrophthalic anhydride, hexahydrophthalic anhydride, methyl endo methylene tetrahydrophthalic anhydride, chlorendic anhydride, ethylene glycoltrimellitic anhydride ester, methyltetrahydrophthalic anhydride, methylhexahydrophthalic anhydride and the like; imidazole derivatives such as imidazole, 2-methylimidazole, 2-ethyl-4-methylimidazole, 2-phenylimidazole, 2-undecylimidazole, 2-heptadecylimidazole, 1-benzyl-2-methylimidazole, 1-cyanoethyl-2-methylimidazole, 1-cyanoethyl-2-phenylimidazole, 1-cyanoethyl-2-ethyl-4-methylimidazole, 1-cyanoethyl-2-methylimidazole trimellitate, 1-cyanoethyl-2-phenylimidazole trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 1-dodecyl-2-methyl-3-benzylimidazolium chloride and the like; dicyandiamide or derivatives thereof; organic acid dihydrazides such as sebacic acid dihydrazide and the like; urea derivatives such as 3-(3,4-dichlorophenyl)-1,1-dimethylurea and the like; and polyamideamines, modified polyamines, boron fluoride-monoethylamine complex, etc. Of these, dicyandiamide, which is a latent curing agent, is preferable because it can provide a one-pack composition.

The amount of the curing agent used can be appropriately determined depending upon the kind of the curing agent used. The amount is ordinarily 2-200 parts by weight, preferably 4-100 parts by weight per 100 parts by weight of the epoxy resin. Needless to say, a curing accelerator, etc. can be used in combination.

The epoxy resin composition of the present invention can be produced by a known mixing method. It can be produced, for example, by passing, through a three-roll mill several times at room temperature, a liquid epoxy resin, a thixotropy-imparting agent, a filler used as necessary, water and a polycarbodiimide resin until a uniform mixture is obtained. At this time, no water component is added if the amount of the water adsorbed or absorbed by the component (s) other than water is within the above-mentioned range.

By adding the above-mentioned curing agent to the thus-produced epoxy resin composition having thixotropy and low stringiness, an epoxy resin-based adhesive of the present invention can be obtained.

The epoxy resin-based adhesive of the present invention, when using, for example, dicyandiamide (a latent curing agent) as the curing agent, is cured at 130°–200° C. in 1–180 minutes, preferably at 150°–180° C. in 10–30 minutes and, when cured, has a sufficient adhesion strength, solder reflow heat resistance and no metal corrosivity. Therefore, the present adhesive is suitable for adhesion of electronic parts to very small areas.

The present invention is hereinafter described in more detail.

EXAMPLES

Production of epoxy resin composition

Example 1

A 500-ml four-necked flask was provided with a stirrer, a thermometer and a condenser. Therein were placed 100.0 g of tetramethylxylylene diisocyanate (TMXDI) and 2.0 g of 3-methyl-1-phenyl-2-phospholene-1-oxide, and they were reacted at 180° C. for about 20 hours to obtain a paste-like polycarbodiimide resin.

Then, 100.0 g of a bisphenol A type epoxy resin, 4.0 g of colloidal silica as a thixotropy-imparting agent, and 4.0 g of the paste-like polycarbodiimide resin obtained above were uniformly mixed by the use of a three-roll mill. The resulting mixture was mixed with 3.0 g of water to obtain an epoxy resin composition.

Example 2

In the same reactor as used in Example 1 were placed 100.0 g of 4,4'-dicyclohexyl diisocyanate (HMDI) and 2.0 g of 3-methyl-1-phenyl-2-phospholene-1-oxide, and they were reacted at 180° C. for about 15 hours. The reaction product was ground to obtain a powdery polycarbodiimide resin.

100.0 g of a bisphenol F type epoxy resin, 3.5 g of colloidal silica as a thixotropy-imparting agent, 3.0 g of the above-obtained powdery polycarbodiimide resin and 2.0 g of water were mixed in the same manner as in Example 1 to obtain an epoxy resin composition.

Example 3

80.0 g of a bisphenol F type epoxy resin, 20.0 g of a phenol novolac type epoxy resin, 5.0 g of bentonite as a thixotropy-imparting agent, 2.0 g of the paste-like polycarbodiimide resin obtained in Example 1, and 0.7 g of water were mixed in the same manner as in Example 1 to obtain an epoxy resin composition.

Production of epoxy resin-based adhesive

Example 4

To the epoxy resin composition of Example 1 were added 8.0 g of dicyandiamide as an epoxy resin-curing agent, 2.0 g of Imidazole $C_{11}$-Z (a product of Shikoku Kasei Kogyo K.K.) also as an epoxy resin-curing agent and 13.0 of carbon 5lack as a filler. They were mixed by the use of a three-roll mill to obtain an epoxy resin-based adhesive.

Example 5

To the epoxy resin composition of Example 2 were added 5.0 g of Imidazole 2E4MZ-CNS (a product of Shikoku Kasei Kogyo K.K.) as an epoxy resin-curing agent and 13.0 of carbon black as a filler. They were mixed in the same manner as in Example 4 to obtain an epoxy resin-based adhesive.

Example 6

To the epoxy resin composition of Example 3 were added 10.0 g of dicyandiamide as an epoxy resin-curing agent and 10.0 of carbon black as a filler. They were mixed in the same manner as in Example 4 to obtain an epoxy resin-based adhesive.

Comparative Example 1

An epoxy resin-based adhesive was obtained in the same manner as in Example 4 except that no polycarbodiimide resin was used.

Comparative Example 2

An epoxy resin-based adhesive was obtained in the same manner as in Example 4 except that no water was used.

Comparative Example 3

An epoxy resin-based adhesive was obtained in the same manner as in Example 4 except that neither polycarbodiimide resin nor water was used.

Comparative Example 4

There was used a commercial adhesive which used a bisphenol A type epoxy resin as a main component.

The above-obtained epoxy resin compositions and epoxy resin-based adhesives were evaluated, and the results are shown in Table 1.

TABLE 1

| Examples | | Stringiness | Rusting |
|---|---|---|---|
| Example | 1 | o | — |
|  | 2 | o | — |
|  | 3 | o | — |
|  | 4 | o | o |
|  | 5 | o | o |
|  | 6 | o | o |
| Comparative Example | 1 | x | x |
|  | 2 | x | o |
|  | 3 | x | Δ~o |
|  | 4 | x | o |

Incidentally, stringiness was measured by dipping the front end of a glass rod in each resin composition, pulling up the glass rod and examining the extent of stringiness of the resin composition. Stringiness was rated according to the following yardstick.

O: The resin composition cut in less than 10 cm.

x: The resin composition was continuous over 10 cm or more.

Rusting was measured by coating each resin composition on a copper plate, heating the plate to cure the coated composition, storing the resulting test piece in a desiccator at 30° C. for one month, and examining the extent of the rusting caused by the composition. Rusting was rated according to the following yardstick.

◯: No rusting was observed.
Δ: Slight rusting was observed.
x: Distinct rusting was observed.

As described above, the epoxy resin composition of the present invention comprises an epoxy resin, a thixotropy-imparting agent, a filler used as necessary, water and a polycarbodiimide resin, and has excellent thixotropy and low stringiness.

The epoxy resin-based adhesive of the present invention comprises the above epoxy resin composition and a curing agent and, when cured, causes neither metal corrosion nor reduction in moisture resistance despite the presence of water in the adhesive and has excellent heat resistance and adhesivity.

We claim:

1. An epoxy resin composition consisting essentially of an epoxy resin, a thixotropy-imparting agent, an optional filler which is different from said thixotropy-imparting agent, a polycarbodiimide resin and water, said water being added water and/or water which has been adsorbed or absorbed by said filler, the amount of said water being 10 parts by weight or less per 100 parts by weight of the epoxy resin.

2. An epoxy resin composition according to claim 1, wherein the amount of the thixotropy-imparting agent is 0.1–30 parts by weight per 100 parts by weight of the epoxy resin.

3. An epoxy resin composition according to claim 1, wherein the amount of said filler is 0.1–1000 parts by weight per 100 parts by weight of the epoxy resin.

4. An epoxy resin composition according to claim 1, wherein the amount of the polycarbodiimide resin is 10 parts by weight or less per 100 parts by weight of the epoxy resin.

5. An epoxy resin-based adhesive comprising an epoxy resin composition consisting essentially of an epoxy resin, a thixotropy-imparting agent, an optional filler which is different from said thixotropy-imparting agent, water and a polycarbodiimide resin, and a curing agent for said epoxy resin which is not said polycarbodiimide resin, said water being added water and/or water which has been adsorbed or adsorbed by said filler, the amount of said water being 10 parts by weight or less per 100 parts by weight of the epoxy resin.

6. An epoxy resin-based adhesive according to claim 5, wherein the amount of the thixotropy-imparting agent is 0.1–30 parts by weight per 100 parts by weight of the epoxy resin.

7. An epoxy resin-based adhesive according to claim 5, wherein the amount of said filler is 0.1–1000 parts by weight per 100 parts by weight of the epoxy resin.

8. An epoxy resin-based adhesive according to claim 5, wherein the amount of the polycarbodiimide resin is 10 parts by weight or less per 100 parts by weight of the epoxy resin.

9. An epoxy resin-based adhesive according to claim 5, wherein the amount of the curing agent is 2–200 parts by weight per 100 parts by weight of the epoxy resin.

10. An epoxy resin composition according to claim 3, wherein said filler is selected from the group consisting of powdery fillers, colorants and flame retardants.

11. An epoxy resin-based adhesive according to claim 7, wherein said filler is selected from the group consisting of powdery fillers, colorants and flame retardants.

12. An epoxy resin composition according to claim 1, wherein said epoxy resin is selected from the group consisting of glycidyl ether epoxy resins, alicyclic epoxy resins, heterocyclic epoxy resins and liquid rubber-modified epoxy resins.

13. An epoxy resin composition according to claim 12, wherein said epoxy resin is selected from the group consisting of bisphenol A epoxy resins, phenol-novolac epoxy resins and cresol-novolac epoxy resins.

14. An epoxy resin-based adhesive according to claim 5, wherein said epoxy resin is selected from the group consisting of glycidyl ether epoxy resins, alicyclic epoxy resins, heterocyclic epoxy resins and liquid rubber-modified epoxy resins.

15. An epoxy resin-based adhesive according to claim 14, wherein said epoxy resin is selected from the group consisting of bisphenol A epoxy resins, phenol-novolac epoxy resins and cresol-novolac epoxy resins.

* * * * *